United States Patent
Kelada

(10) Patent No.: US 10,703,650 B2
(45) Date of Patent: Jul. 7, 2020

(54) METHODS OF MAKING FLAT SHEET MEMBRANE ELEMENT ADAPTED FOR USE IN SYMBIOTIC FLUIDS FACTIONATION, WATER TREATMENT, AND OSMOTIC PROCESSES

(71) Applicant: Maher Isaac Kelada, Houston, TX (US)

(72) Inventor: Maher Isaac Kelada, Houston, TX (US)

( * ) Notice: Subject to any disclaimer, the term of this patent is extended or adjusted under 35 U.S.C. 154(b) by 138 days.

(21) Appl. No.: 15/760,342

(22) PCT Filed: Sep. 19, 2016

(86) PCT No.: PCT/US2016/052486
§ 371 (c)(1),
(2) Date: Mar. 15, 2018

(87) PCT Pub. No.: WO2017/049290
PCT Pub. Date: Mar. 23, 2017

(65) Prior Publication Data
US 2018/0257956 A1 Sep. 13, 2018

Related U.S. Application Data

(63) Continuation of application No. 14/967,295, filed on Dec. 12, 2015, now abandoned.
(Continued)

(51) Int. Cl.
*C02F 1/44* (2006.01)
*B01D 61/08* (2006.01)
(Continued)

(52) U.S. Cl.
CPC ............. *C02F 1/441* (2013.01); *B01D 61/08* (2013.01); *B01D 63/082* (2013.01); *B01D 65/02* (2013.01);
(Continued)

(58) Field of Classification Search
None
See application file for complete search history.

(56) References Cited

U.S. PATENT DOCUMENTS

| | | | |
|---|---|---|---|
| 3,266,629 A * | 8/1966 | Megibow | B01D 63/082 210/321.73 |
| 7,048,855 B2 | 5/2006 | de la Cruz | |

(Continued)

FOREIGN PATENT DOCUMENTS

EP 959974 B1 8/2003

*Primary Examiner* — Krishnan S Menon
(74) *Attorney, Agent, or Firm* — David Guerra

(57) ABSTRACT

The present application includes a system and method that introduces a rather new and unique approach to desalinating or recovering energy from hyper saline waters. The system includes a flat sheet membrane panel assembly including a plurality of membranes laid flat. A plurality of end caps are coupled to the plurality of membranes on opposing ends. A frame is configured to house the plurality of membranes and the plurality of end caps. The frame includes a top and bottom header to secure the membranes and permit the passage of fluid away from the membranes. The method includes subjecting a flat sheet membrane to pressurized untreated fluid. The fluid passes through a porous portion of a frame and is filtered by one or more flat sheet membranes. The treated fluid is collected and the brine is discharged. Pressure of the fluid is regulated to maintain consistent levels.

20 Claims, 16 Drawing Sheets

PS: Panels Stack
SW: Seawater
BW: Brackish Water

Related U.S. Application Data

(60) Provisional application No. 62/220,874, filed on Sep. 18, 2015.

(51) Int. Cl.
*B01D 63/08* (2006.01)
*B01D 65/02* (2006.01)
*B01D 61/02* (2006.01)
*C02F 103/08* (2006.01)

(52) U.S. Cl.
CPC ........ *B01D 61/025* (2013.01); *B01D 2313/21* (2013.01); *B01D 2313/23* (2013.01); *B01D 2321/04* (2013.01); *C02F 2103/08* (2013.01); *C02F 2209/03* (2013.01); *C02F 2303/16* (2013.01); *Y02A 20/131* (2018.01); *Y02W 10/37* (2015.05)

(56) References Cited

U.S. PATENT DOCUMENTS

| | | | |
|---|---|---|---|
| 8,157,881 B1 * | 4/2012 | Anoszko | B01D 46/0005 55/497 |
| 8,668,828 B2 | 3/2014 | Knappe et al. | |
| 8,685,252 B2 | 4/2014 | Vuong et al. | |
| 2008/0264845 A1 | 10/2008 | Max | |
| 2010/0237016 A1 | 9/2010 | Vuong | |
| 2012/0304862 A1 * | 12/2012 | Taylor | B01D 53/268 96/8 |
| 2014/0231333 A1 | 8/2014 | Kelada | |
| 2015/0014232 A1 * | 1/2015 | McGinnis | B01D 61/364 210/180 |

* cited by examiner

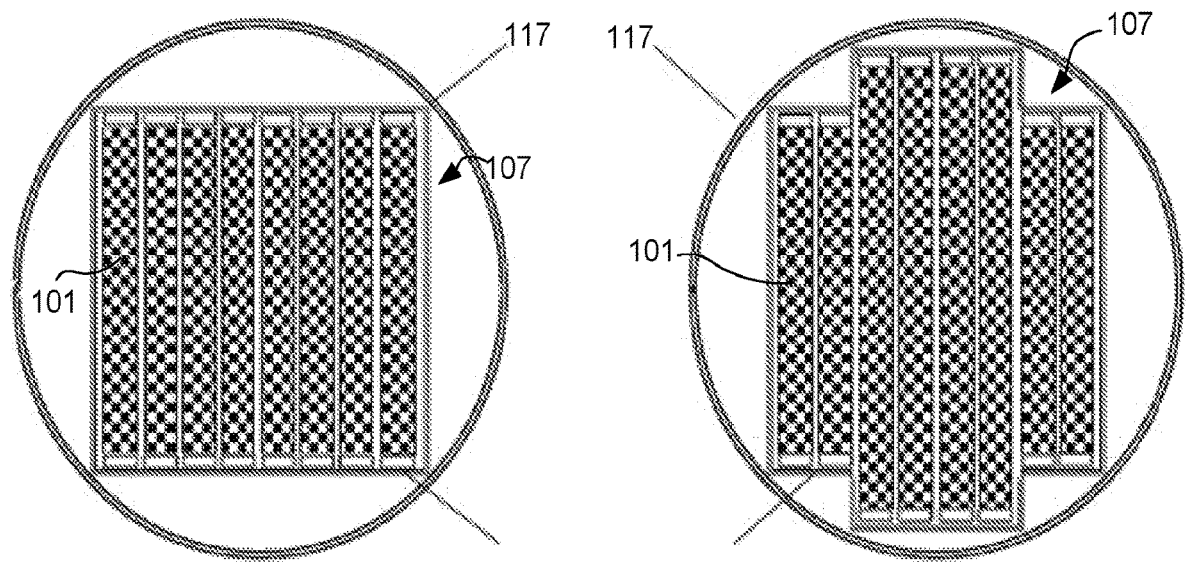
Reverse osmosis frames internal flow management enclosure – internal & external pressure are essentially the same
FIG. 3                    FIG. 4

Basic flat membrane panel components

METHODS OF MAKING FLAT SHEET MEMBRANE ELEMENT ADAPTED FOR USE IN SYMBIOTIC FLUIDS FACTIONATION, WATER TREATMENT, AND OSMOTIC PROCESSES

CROSS-REFERENCE TO RELATED APPLICATIONS

This application is an U.S. national phase application under 35 U.S.C. § 371 based upon co-pending International Application No. PCT/US2016/052486 filed on Sep. 19, 2016. Additionally, this U.S. national phase application claims the benefit of priority of co-pending International Application No. PCT/US2016/052486 filed on Sep. 19, 2016, which claims the benefit of priority of U.S. Provisional Application No. 62/220,874 filed on Sep. 18, 2015 and U.S. Non-Provisional application Ser. No. 14/967,295 filed on Dec. 12, 2015. The entire disclosures of the prior applications are incorporated herein by reference. The international application was published on Mar. 23, 2017 under Publication No. WO 2017/049290 A1.

TECHNICAL FIELD

The present application relates generally to Induced Osmotic Potential (ISO) for salinity power generation by employing hollow fiber membranes.

DESCRIPTION OF THE PRIOR ART

Various different membranes are commonly used as a filtration device in filters. One of the most common uses of membrane filtration is in the areas of osmosis, microfiltration, ultrafiltration, and nanofiltration. Membranes are shaped differently depending on the application.

An example of a type of membrane used in filtration devices is a semipermeable membrane. Semipermeable membranes are effective and economical for use in a process for water purification or desalination by osmosis. However, current semipermeable membranes technologies, particularly for seawater (3.5% salinity) desalination are limited to two types of commercial designs; spiral wound of flat sheet membrane and hollow fiber membrane.

Some common difficulties with present membranes are that they are formed as closely packed rolled spiral wound membrane sheets or tightly bundled hollow fiber membranes causing water stagnation along contact surfaces. This further promotes salt accumulation, resulting in concentration polarization and loss of separation efficiency. These types of membranes are intended only for ultra or nano-filtered water desalination. It is uncommon to use this type of membrane for conventional raw water filtration due to plugging issues.

It is desired to develop and introduce a unique process concept applicable in several processes including maximizing power generation, as in the case of Induced Symbiotic Osmosis [ISO] for salinity water power generation, seawater desalination recovery of 75% or higher, hypersaline water reverse osmosis, heatless solutes recovery by means of chemical potential dissimilarity of solutions, as well as fractionation of gases based on the kinematic diameters of molecules, employing series of semipermeable flat membrane cells operating in symbiotic fashion, where each process is formed of closed hydraulic loops operating within a concentration potential field.

It is also desirable to develop a process and membrane that promotes the design of large scale renewable resources (LSRR) anywhere natural or manmade physical domains or ecological topography allows for cycling waters of dissimilar salt concentrations. Furthermore, it is desired to develop a process and membrane that permits a system to generate power from world endorheic saline water, salt deposits, saline aquifers, dry salt lakes, formulated ionizable Inorganic salt solutions, as well as with a fully closed ISO systems relying essentially on daily solar heat cycle.

Although some strides have been made in membrane technology, considerable shortcomings remain.

BRIEF SUMMARY OF THE INVENTION

In view of the foregoing disadvantages inherent in the known types of membranes now present in the prior art, the present technology provides a novel flat sheet membrane panel system and method of using the membrane panel system, and overcomes the above-mentioned disadvantages and drawbacks of the prior art. As such, the general purpose of the present technology, which will be described subsequently in greater detail, is to provide a new and novel flat sheet membrane panel system and method which has all the advantages of the prior art mentioned heretofore and many novel features that result in a flat sheet membrane panel system which is not anticipated, rendered obvious, suggested, or even implied by the prior art, either alone or in any combination thereof.

To attain this, the present technology essentially includes a flat sheet membrane panel system can include a plurality of membrane panel assemblies, at least one end cap, and at least one frame. Each membrane panel assemblies can include a membrane panel, a sealing sleeve configured to secure and receive front and back edges of the membrane panel, and a protective rigid polymeric or rustproof metallic porous shielding screen configured to shield the membrane panel, and the sealing sleeve.

The membrane panel can include at least two adjacent permeable or semipermeable flat sheet membranes in an un-rolled configuration of same size and specification. The flat sheet membranes can be separated by a flat porous permeate carrier comprising an intermediate flow channel for communicating permeated desalinated water across the flat sheet membranes.

The end cap can be coupled to and configured to receive opposing ends of each or all of the membrane panel assemblies, and can be configured to permit passage of fluid away from the membranes.

The frame is configured to house each or all of the membrane panel assemblies, and can include a top header, a bottom header, and porous side members configured to allow for passage of fluid or saline water. The top and bottom headers each are configured to receive one of the end caps, respectively, so the membranes are oriented in a vertical pattern between the top and bottom headers. The top and bottom headers being configured to communicate treated fluid or desalinated water from the membrane panel.

The panel assemblies can be separated apart to maintain flow Reynold's number of 3,000-3,500 for mitigating membrane fouling, maintaining a clearance of least of 1-2 mm (0.04-0.08 inch) for regular maintenance practices.

In some embodiments, the frame is housed in holding compartments that are mounted within horizontal train of units, or vertical pressure vessels and multi stages towers. The frame can be 10-15 cm (4-6 inch) in depth, comprising 6-12 of the panel assemblies.

Opposite membrane panel edges, left and right sides of the membrane panels, can be heat or epoxy sealed.

In some embodiments, a stack of a plurality of the membrane panel are mounted within the end cap, and each of the end caps is inserted and epoxy sealed to a track defined in the top and bottom headers, respectively.

In an aspect of the present technology, the frame can be up to one (1) meter in width and up to two (2) meters length.

In another aspect of the present technology, the flat sheet membranes, in an un-rolled configuration, can be formed by as a tube by blowing the membrane polymeric material; rolling and sealing a membrane flat sheet, then flatten it and pack it with permeate carrier material, as a preformed board; or laying down the permeate carrier material, as a preformed board, on a flat sheet membrane of size that exceeds the permeate carrier material perimeter, then roll the sheet around the board and seal its edges by adhesive sealing, heat sealing, or ultrasonic welding.

In still another aspect, the porous permeate carrier is a porous polysulfone membrane support board, less than 5 micron pores, Zirfon with low zirconia.

There has thus been outlined, rather broadly, features of the invention in order that the detailed description thereof that follows may be better understood and in order that the present contribution to the art may be better appreciated.

The invention may include at least one feed spacer made from a polyester or polypropylene membrane. The feed spacer can be positioned between each of the membranes and the shielding screen. There are, of course, additional features of the invention that will be described hereinafter and which will form the subject matter of the claims attached.

The invention may also include an automated or semi-automated assembly platform for assembling the membrane panel. The assembly platform can include a moving belt, where a first of the shielding screen is laid down on the belt, followed by a first of the feed spacer, then by the membrane panel, followed by a second of the feed spacer, then by a second of the shielding screen. Wherein bottom and top edges of the shielding screens are continuously welded or epoxy sealed.

In some embodiments, a screen can be positioned inside the porous permeate carrier. The screen can be an interstitial porous aluminum oxide, a woven metal screen having channels, a nonwoven polyester fiber mat or a polysulfone fiber mat.

In some aspects, the flat sheet membranes are made of polyamide or cellulose acetate flat sheets.

In even other aspects, the top and bottom headers each can include at least one outlet formed configured to allow passage of fluid or desalinated water, and wherein the porous side members are configured to allow pressurized saline water to pass therethrough and through the membranes.

In other aspects, the plurality of membrane panel assemblies can be configured to be suitable for at least one of water filtration, brackish water, and seawater, brines desalination, fluid extraction, solute recover, symbiotic salinity power generation, symbiotic hypersalinity reverse osmosis, and gas mixture fractionation.

In some embodiments, the frame further can comprise a rolling device configured to translate the frame on the bottom header within a pressure vessel.

In other embodiments, each of the membrane panel assemblies can further comprise a porous protective woven fabric draping flat sides of the membrane panel.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

Lastly, it is an object of the present technology to provide a new and novel method of using a flat sheet membrane panel system for treating of a fluid using osmotic processes of various salinities and pressures. The method can include the steps of:

introducing a pressurized untreated fluid to a first porous side member of a frame configured to house at least one membrane panel that includes at least two adjacent permeable or semipermeable flat sheet membranes separated by a flat porous permeate carrier;

subjecting the membrane panel to the fluid, and passing the fluid parallel to the flat sheet membranes;

communicating permeated the fluid across the flat sheet membranes by way of an intermediate flow channel of the flat porous permeate carrier;

collecting a treated fluid by way of a track defined in a top and bottom header of the frame;

disposing of brine through a second porous side member of the frame; and regulating pressure of the fluid in a pressure vessel, with the membrane panel located in the pressure vessel.

In some aspects of the method, the membrane panel can include a sealing sleeve configured to secure and receive front and back edges of the membrane panel, and a protective rigid polymeric or rustproof metallic porous shielding screen configured to shield the membrane panel, and the sealing sleeve.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 3 is an exemplary side view of a first layout of the panel assembly of FIG. 1 in a pressure vessel housing;

FIG. 4 is an exemplary side view of a second layout of the panel assembly of FIG. 1 in a pressure vessel housing;

Figures 1, 2:
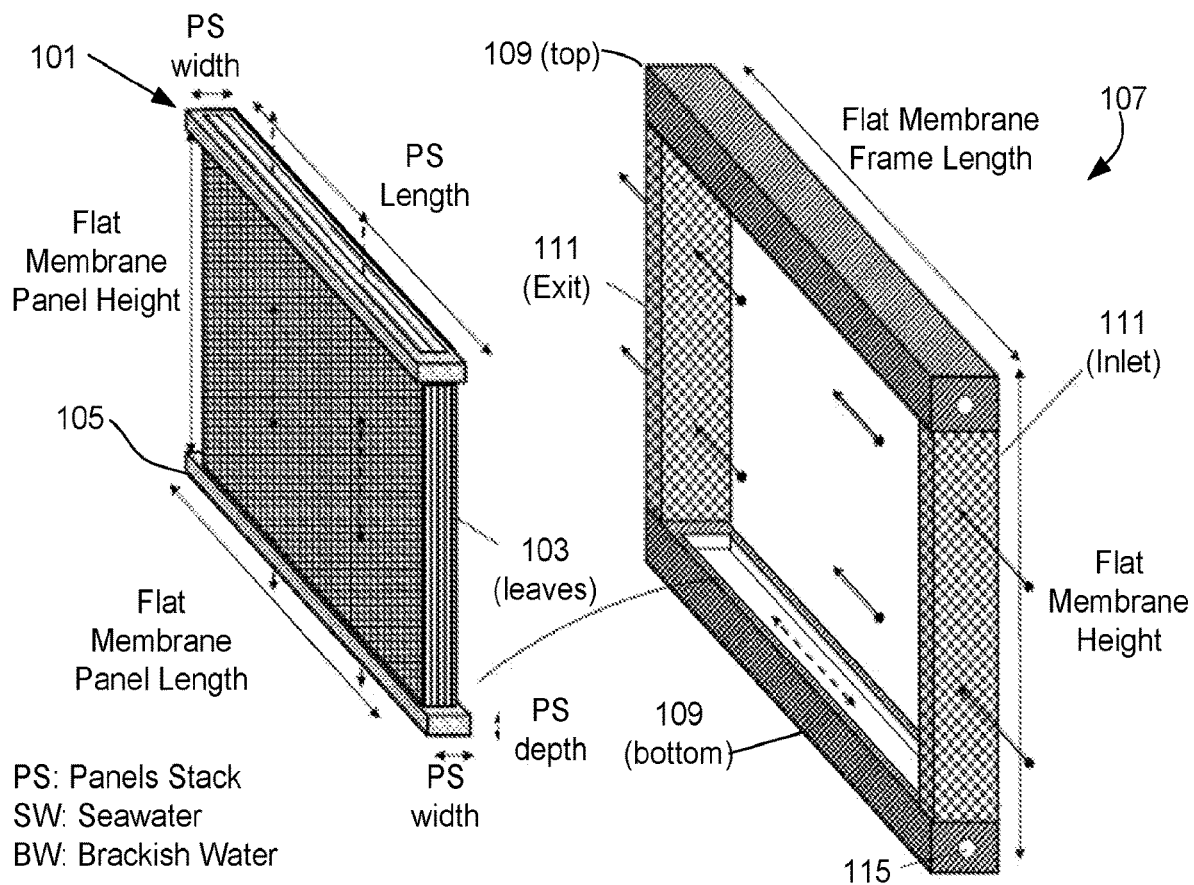
FIG. 1 is a perspective view of a flat reverse osmosis panel assembly according to the preferred embodiment of the present application using a flat membrane.
FIG. 2 is a perspective view of a reverse osmosis panel frame used to hold the panel assembly of FIG. 1.

While the system of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system in accordance with the present application overcomes one or more of the above-discussed problems commonly associated with conventional membrane technology. Specifically, the system of the present application is intended to expand this field of technology by employing conventional Flat Sheet Membranes not only in the broad field of symbiotically harnessing the potential of aqueous electrolytic solutions by means of the natural phenomenon of osmosis, but also for fractionation of hydrocarbon and industrial gases, microfiltration, ultrafiltration and nanofiltration, as well as all processes that are based on hollow fiber or spiral wound membranes. In essence, it is the inventor's attempt to standardize many of the technologies for molecular exchange or manipulation of fluids that are currently in use in water, solutions and gases technologies in just one adaptable technology. These and other unique features of the system are discussed below and illustrated in the accompanying drawings.

The system will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

This invention pertains to Permeable and Semipermeable Flat Sheet Membranes (SFSM), novel applications of which are seen with:

1. Agitated Axial Flow Reverse Osmosis,
2. Agitated Oscillating Flow Reverse Osmosis,
3. Agitated Axial Flow Vertical Wells Reverse Osmosis,
4. Agitated Axial Flow Underground Vertical Wells Reverse Osmosis,
5. Induced Symbiotic Osmatic [ISO] For Salinity Power Generation,
6. Symbiotic Hypersaline Water Reverse Osmosis,
7. Induced Symbiotic Osmosis (ISO) For Solutes Recovery/Fluids Concentration, and
8. Symbiotic Gases Fractionation Processes.

Definitions for reference within the present application are as follows:

In aqueous solution, osmosis is the spontaneous movement of water, through a semipermeable membrane that is permeable to water but impermeable to solute, where water moves from a solution in which solute is less concentrated to a solution in which solute is more concentrated.

The driving force of the flow movement is the difference in the chemical potential on the two sides of the semipermeable membrane, with the solvent moving from a region of higher potential (generally a lower solute concentration) to the region of lower potential (generally higher solute concentration).

"Chemical Potential" appears to be an ambiguous and elusive terminology. In fact, it is one of the most important partial molar quantities. It is the energy potential associated with the activity of the ions of an ionizable substance. It is equal to the rate of change of system's free energy, known as "Gibbs Free Energy", of a system containing a number of moles of such substance, when all other system parameters; temperature, pressure and other components are held constant. Simply, chemical potential is a form of energy like other kinds of potential; electrical, gravitational, momentum, magnetic, surface tension, etc. where, it is spontaneous and in the direction from high to low.

The difference in chemical potential of a substance in two adjacent phases separated by a semipermeable membrane determines the direction in which the substance diffuses spontaneously. When the components of a mixture have the same chemical potential no chemical transport or reaction takes place, and no mutual diffusion will occur, because there is no driving force. The chemical potential is an intensive property of a substance in a phase.

To prevent this movement of water across the semipermeable membrane, a pressure has to be imposed to equalize the force created by the difference in the chemical potential of the solution across said membrane. This force is named osmotic pressure. If the imposed pressure exceeds this limit, then water begins to flow from the region of higher solute concentration to the region of lower solute concentration. In this case, the force is named reverse osmosis pressure.

Regarding the title of this invention, the inventor believes that osmosis is nature's one of the two gifts to life; Photosynthesis and Osmosis. It is the vehicle to transport fluids in all living cells and without it, all biological functions and all forms of life cease to exist! This phenomenon is attracting the attention of researchers as a means to generate power. They tend to describe it in industrial terms such as forward osmosis, ordinary osmosis, direct osmosis, pressure retarded osmosis, etc.

In order to harness this natural phenomenon, it is believed that relevant potential fields should be established to induce and bring about the wonders of this phenomenon. Therefore, it is preferred that all applications that utilize the power of osmosis for the benefit of mankind, be described as "Induced Osmosis".

Further, the term "Symbiosis", although a biological phenomenon, its generic or metaphorical concept refers to a mutually relationship of cyclic reverberation, without altering or modifying any of the specific components of the involved systems. In industrial applications, symbiosis is a process whereby a waste or less valuable byproduct in one industry is turned into a resource for use in one or more other industries. In essence, Symbiosis is the process of optimizing functions of interrelated systems and achieves their ultimate availability.

Therefore, the present application is naming the process of using osmosis to transfer water spontaneously from low salinity water to high salinity water across a membrane in interrelated sequence of cells as "Induced Symbiotic Osmosis" and is abbreviated here by the acronym "ISO".

An objective of the present application is to develop a new comprehensive technology employing conventional permeable and/or semipermeable flat sheet membranes [FSM] for multiple objectives including; liquid and gas fluids fractionation, fluid (water) treatment, osmotic desalination processes and induced osmotic power generation of various salinities and pressures; as a stand-alone unit operation or as trains of multi-unit processes, functioning in symbiotic fashion.

Any and all fluid separation and osmotic power generation units operate, as a "train", in symbiotic fashion and are essentially of the same design and configuration, but of different sizes, numbers and operating specifications.

Seawater desalination (3.5-4.5%) is the most stringent membrane application. It requires a "train" of multiple filtration units and only one reverse osmosis unit of high operating pressure. [Note: this is a reason that most of the drawings reflect reverse osmosis process].

Seawater desalination by a reverse osmosis unit in a train may require pressure exceeding 1000 psi, while seawater microfiltration units in the same train may require pressure of less than 100 psi. Hypersalinity Induced Symbiotic Osmosis (ISO) Power Generation requires a train of multiple cells of changing pressure and changing concertation.

It is a further object of the present application that all fluid separation units operate in turbulent flow region to prevent premature membrane fouling, particularly in the case of reverse osmosis applications, due to low flow velocity. Turbulence is determined by maintaining a Reynold's number above 3000 and is achieved by fluid (water) agitation, specifically by fluid recirculation within a set of membrane panels to agitate fouling matter and minimize its settling on membrane surface. A relatively small pumping system operates at very small differential pressure to circulate fluid within each vessel or a compartment of a vessel.

Employing the concept of symbiotic operation of a train comprising multiple fluid separation units of essentially the same design and configuration and functioning harmonically in sequential steps may eliminate the need for intermediate fluid storage and pumping facilities. A typical case is the desalination of brackish or seawater by reverse osmosis, where the following functions could form a train of sequentially required and operated number of units; micro filtration, ultrafiltration, nanofiltration, followed by reverse osmosis or brine power generation. Note: Incoming raw water has much greater volume than the final product. If the units size is about the same, the capacity of the final treatment unit; RO, determines the required number of the prior water treatment function.

All required fluid separation vessels discussed herein can be installed indoor or outdoor, horizontally or vertically, above or below grade; thereby eliminating the need for elevated membrane modules racks and massive size housing. Reduced sized trains can be also truck mounted for emergency response; pumping treated water directly from a lake, drainage canal, or the sea to end user.

Referring now to the drawings wherein like reference characters identify corresponding or similar elements in form and function throughout the several views.

The proposed technology introduces rather new unique approach to desalinate or recover energy from hyper saline waters and entitled "Induced Symbiotic Osmosis Process [ISO]". ISO comprises series of cells, each forming a closed hydraulic loop comprising pumping and power recovery; generation turbine or pressure exchanger, sharing semipermeable membranes between pre and post cells. Here, each cell is charged with brine of specified salt quantity and type, operated at progressively increasing concentration and osmotic pressure ratio, all cells in the series function simultaneously in symbiotic mode. Transport within cells is chemically driven under the influence of concentration potential field bounded by water of low salt concentration (LC) and by natural or manmade brine of high salt concentration (HC), thermodynamically approaching reversibility between cells.

This invention is rooted in the field of physics and pertains to the development of a chemical engineering conceptual process design, presenting new vision in the energy field. The inventor believes that understanding the basic physics and thermodynamics pertain to solutions and osmosis and their industrial application in this alternative green energy field have comprehensive value in appreciating this proposed technology. Therefore, it is the objective of the inventor to present his vision in concise, simple presentation and easy to follow explanation of the subject process, without entanglement in equipment and parts numbers. Further, all operating conditions and units of measurement and analyses are clearly defined and stated to avoid controversial opinions when relevant arts are examined. This application is rather large and it is the intention to describe it in logical steps starting with theoretical and mathematical background, substantiated with examples and analytical evaluation, then followed by several large scale potential applications of different complexity.

The first law of thermodynamics rules out the possibility of constructing a machine that can spontaneously create energy. However, it places no restrictions on the possibility of transferring energy from one form into another.

Then, osmotic pressure mathematical general form can be presented as:

$$\Delta \pi = \Delta p = RT\Delta C_s \qquad \text{(Eq. 01)}$$

The osmotic pressure $\pi$ was originally proposed by Nobel Laureate Van't Hoff and modified to include Staverman's osmotic reflection coefficient to become;

$$\pi = \Phi i c R T \qquad \text{(Eq. 02)}$$

Where:
$\pi$=osmotic pressure or force imposed on the membrane given in bars, atm, psi, etc.
$\Phi$=Osmotic Reflection Coefficient (NaCl=0.93, $CaCl^2$=0.86, Mg $CaCl^2$=0.89, etc.),
i=Ions concentration per dissociated solute molecule ($Na^+$ and $Cl^-$ ions=2),
c=molar concentration of the salt ions,
R=gas constant (0.08314472 liter·bar/(k·mol)),
T=ambient temperature in absolute Kelvin degrees (20° C.+273°=293° K).

In the case of sea water, the amount of average concentration of oceans salt is about 3.5% (35 gram/liter) mostly in the form of sodium chloride (NaCl). For simplicity of calculation, it is assumed that seawater contains 35 grams NaCl/liter. The atomic weight of sodium is 23 grams, and of chlorine is 35.5 grams, so the molecular weight of NaCl is 58.5 grams. The number of NaCl moles in seawater is 35/58.5=0.598 mol/liter and the osmotic pressure of seawater is $\pi$=[0.93] [2] [0.598 mol/liter][0.08314 liter·bar/(k·mol)] [293 K]=27.11 bar Since one bar=100,000 Pascal (Pa) and one kilogram (force) per square centimeter ($kg_f/cm^2$)=98066.5 Pascal, computation of osmotic pressure, $\pi$ and energy, $SW_E$, $LW_E$ can be presented in several forms:
$\pi$=[27.1×$10^5$ Pa]/[98066.5 Pa/($kg_f/cm^2$)]=27.63 $kg_f/cm^2$
$\pi$=[27.63 $kg_f/cm^2$] [m/100 cm] [1000 $cm^3$/liter]=276.3 $kg_f$·m/liter a. $SW_E$=[276.3 $kg_f$·m/liter] [9.80665 Joule/$kg_f$·m]=2711 Joule/liter=2.711 $MJ/m^3$ b. $SW_E$=[2711 Joule/liter] [1 cal/4.184 J] [1 kcal/1000 cal]=0.6479 kcal/liter
c. $SW_E$=[2711 Joule/liter] [1000 liter/$m^3$]=2.710 $MJ/m^3$=0.751 $kWh/m^3$ In case of generating power continuously (1 $m^3$ per sec, every second per day), which is the case with power generation systems, the theoretical potential power capacity of this system is:

d. [2.711 $MJ/m^3$] [1 $m^3$/s] [3600 s]=9.759×$10^9$ J=[9.759×$10^9$ W·s] [h/3600 s]=2,711 kWh
e. $SW_E$=[2,711 kWh] [24 hrs/day] [365 days/year]=23.75× $10^6$ kWh annually.

In the case of hyper saline lake such as in Gunnison Bay of the Great Salt Lake-USA, the amount of average salt concentration is about 24% (240 gram/liter) mostly in the form of sodium chloride (NaCl). Lake water osmotic pressure is calculated as:

$\pi$=[0.93] [2] [4.1026 mol/liter] [0.08314 liter·bar/(k·mol)]· [293 K]=185.88 bar For continuous power generation by exchanging Gunnison Bay brine with Bear River fresh water, at a rate of 1 $m^3$ per sec, the theoretical potential power capacity of the lake water (LW) of such system where; 1 W=J/s, 1 W·s=J, 1 kWh=3.6×$10^6$ J, then:

$LW_E$=[18.2286 $MJ/m^3$] [1 $m^3$/s] [3600 s]=[65.623×$10^9$ J] [1 kWh/3.6×$10^6$ J]=18,228.6 kWh
$LW_E$=[18,228.6 kWh] [24 hrs/day] [365 days/year] =159.682×$10^6$ kWh/year.

For membrane selection in osmotic processes, several types of semipermeable membranes such as stirred cell membrane, flat sheet tangential flow membrane, tubular membrane, spiral-wound membrane and hollow fiber membrane can be used for the ISO technology applications. In this invention, high pressure Semipermeable Flat Sheet Membranes (SFSM) that are intended for seawater and brine desalination are being adopted. Such membranes should operate with salinity that is less than salt saturation point to minimize concentration polarization, as well as maintaining relatively even flow distribution through the flat membrane panels.

Commercially available permeable and semipermeable flat sheet membrane elements of conventional sizes (generally 40 inch×60 inch, ~1.0 m×1.5 m), or commercially available suitable membrane of other sizes are being adopted in this invention for water filtration, gases fractionation, brackish water and seawater desalination, fluid extraction and solute recovery, symbiotic salinity power generation, symbiotic Hypersalinity reverse osmosis, where flat sheet membrane elements are adapted for use as flat plates in the form of rectangular panels, mounted in rectangular frames comprising top and bottom water collecting headers, where said frames assembly is mounted within one or more sequential or parallel pressure vessels.

In the case of water desalination, the membrane elements are subjected externally to pressurized untreated water at a pumping pressure that is higher than its osmotic pressure, as in case of reverse osmosis, where treated water is collected in the frame headers and transported to storage for future use, while the rejected saline water outside the membrane is disposed.

In the case of osmotic power generation, the membrane elements are subjected externally to saline water operating at a pumping pressure that it is relatively less than its osmotic pressure, to enhance treated low or no salinity water flowing in the frame headers to be induced spontaneously across the flat semipermeable membrane into the saline water, where the combined flows of both the saline water and the permeated induced water, being at the initial saline water pumping pressure, is circulated through a turbine to generate power that exceeds the power that is consumed to pump the saline water. The same cycle is repeated in the subsequent cells, but at different concentrations and pumping pressures.

The subject technology is adaptable to the various specifications of flat sheets membranes as disclosed herein and is a companion technology for hollow fiber applications.

Concentration polarization results of accumulation of dissolved salt at the membrane surface, creating relatively high localized osmotic gradient, reducing osmotically driven normal permeate diffusion and hinders membrane flux. However, since ISO cells are charged with circulated brine of formulated salt content in closed loops, membranes are less susceptible to concentration polarization. Pretreatment is required for inlet water feed, particularly when organic fouling is anticipated. In general, membranes operating in induced osmosis mode are less susceptible to this phenomenon due to the low pressure imposed on membrane as compared with membranes in reverse osmosis service.

Energy, as equated to the water head, of this stream is now higher than the potential energy of the seawater feed, where it is preferentially used to generate energy.

Symbiotic Osmosis Power Generation is a grassroots technology. Since the objective here is to generate power, each system must be analyzed based on equitable and technically sound criterion to determine validity of assumptions and merits of such processes. Therefore, several parameters and means of measurements are defined by the inventor in the following to facilitate systems simulation:

Specific gravity (SG) is estimated at 20° C., using the inventor's following relation:
[SG=1+0.0077×C %], where C is salt concentration in the form of sodium chloride, since saline waters contain mostly this salt.

Turbine Energy (MJ)=($\pi$) ($\rho$) (g) (h) (Q), where $\pi$: turbine efficiency (<1.0), $\rho$: density (kg/m$^3$), g: acceleration of gravity (9.81 m/s$^2$), h: water column height, head (m), Q: water or brine flow (m$^3$/s), MJ: Mega Joule, Watt=Joule (J)/second.

Another simplified estimation is based on concentration, where turbine generated power equals [(0.658 MJ per 1% of concentration) (C %) (SG) (Q)], based on turbine hydraulic efficiency of 85% and where C, SG and Q are flow conditions at the turbine inlet.

Similarly, pumping requirement can be also based on concentration, where pump shaft energy equals [(1.033 MJ per 1% of concentration) (C %) (SG) (Q)], based on pump efficiency of 75% and where SG and Q are flow conditions at the outlet of the pump, but C is the concentration % at the inlet of the turbine, where pumping is intended to overcome the osmotic pressure leaving the membrane.

Considering as an example the power generation from the Great Salt Lake of Utah, USA, an ISO train comprises three (3) cells operating at constant cell (HC/LC) ratio of 4.0, employing 1 m$^3$/s from Gunnison Bay with salinity of 24% salt is exchanged with 3 m$^3$/s with negligible salinity from Bear River water, operating at equal Log Mean concentration difference (LMCD) of 4.43 across membranes would generate a net energy of about 17,000 kWh.

Fouling of membranes is a serious problem in reverse osmosis desalination and directly affect process efficiency and economics. Pall Corporation indicated that 28% Costs Improvement can be achieved by effectively protecting reverse osmosis units. Generally, all types of membrane separation technology are susceptive to a certain degree of foiling. In principal, reverse osmosis is a process is intended to filter water only. Since water molecules is about 0.275 nanometer (0.275×10$^{-9}$ meter), then any particle larger that this size is considered a foiled matter and has to be removed.

However, since there are different types of foiling, different types of treatment may be required; i.e., mineral deposits, organic and inorganic matter, biological matter, bacterial and algae films, dissolved chemical compounds, herbicides and insecticides, etc., it must be more than one process to remove these foreign matter before any reverse osmosis process. In addition, there are also other significant types of foiling that takes place within and among the membranes surface.

Concentration Polarization is one type of these foiling mechanism that result in formation of salt spots or layers on the membrane surface that have higher salt concentration, increasing the osmotic pressure at the membrane surface than the feed water and causing reversed is the flow direction, reducing the separation efficiency of this membrane. For this reason, the inventor specifies, in this membrane separation technology, that membrane contact is not allowed and flow velocity is maintained at minimum Reynolds Number of 3000. Regarding flux redistribution in multi-elements reverse osmosis system, housing has to be sized to meet Reynolds number criterion. Where Reynolds number is calculated as follows:

$$Re=(\rho v D_H)/\mu$$

$\rho$=density (kg/m$^3$), v=velocity (m/s), $D_H$=hydraulic diameter, $\mu$=Dynamic viscosity kg/(m·s)

Existing technologies suffer from what is known as concentration polarization phenomenon. The use of hydrophilic semipermeable membranes in hollow fiber panels significantly mitigates this phenomenon. Hydrophilic literally means "water-loving." Accordingly, a hydrophilic material exhibits an affinity for water, and tends to readily adsorb water.

Suitable hydrophilic semipermeable membranes have a surface tension sufficiently high (surface tension of the membrane has to be higher than the surface tension of water) to maintain materials at the surface of the semipermeable membrane in liquid form. In one embodiment, the surface tension of the hydrophilic semipermeable membrane is about 35 dyne/cm or more.

In one embodiment, the hydrophilic semipermeable membrane material has a surface tension of about 44 dyne per centimeter or more. Hydrophilic membrane materials having suitable surface tensions include, for examples, Polyepichlorohydrin (surface tension-35), Polyvinyl Chloride (PVC) (surface tension-39), Polyethersulfone (surface tension-41), Polyethylene Terephthalate (Polyester) (surface tension-43), Polyacrylonitrile (surface tension-44); Cellulose (surface tension-44), and variants thereof.

In one embodiment, the hydrophilic semipermeable membrane material is cellulose acetate. Cellulose acetate has a surface tension of 44 dyne per centimeter (dyne/cm), or 44 milli Newton/meter. In one embodiment, the hydrophilic semipermeable membrane is a cellulose triacetate (CTA) membrane. A suitable CTA seawater semipermeable membrane in the form of hollow fiber is manufactured by the Japanese corporation, Toyobo Co, Ltd.

The present application may be subject to many modifications and changes without departing from the spirit or essential characteristics thereof. The present embodiment should therefore be considered in all respects as illustrative and not restrictive of the scope of the subject invention as defined by the appended claims.

Apparatus Relevant Components, Design and Specification List for the present application are illustrated and described in the following Figures:

FIG. 1 illustrates a flat membrane panel assembly including one or more flat membranes 103 and one or more end caps 105. The assembly 101 has a designated length, width, and height. Caps 105 also include a similar width, height, and length corresponding to the dimensions of the flat membranes 103.

FIG. 2 illustrates a frame 107 used for housing and securing assembly 101. Frame 107 includes a header 109 on either end (bottom and top) and a perforated (porous) side member 111 to allow for the passage of seawater and brackish water. The arrows shown in FIG. 2 illustrate the passage of the water through the side members 111 which in turn would be passed through assembly 101. Assembly 101 lies within a track 113 in headers 109. A desalinated water outlet 115 is located along a header 109 to allow for the passage of desalinated water.

FIG. 3 illustrates a type 1 membrane layout having symmetrical structure and function. FIG. 4 illustrates a type 2 membrane layout maximizing cross-section usage using frames 107 of different sizes. Each may use assembly 101 inside pressure vessel 117.

Figure 5:
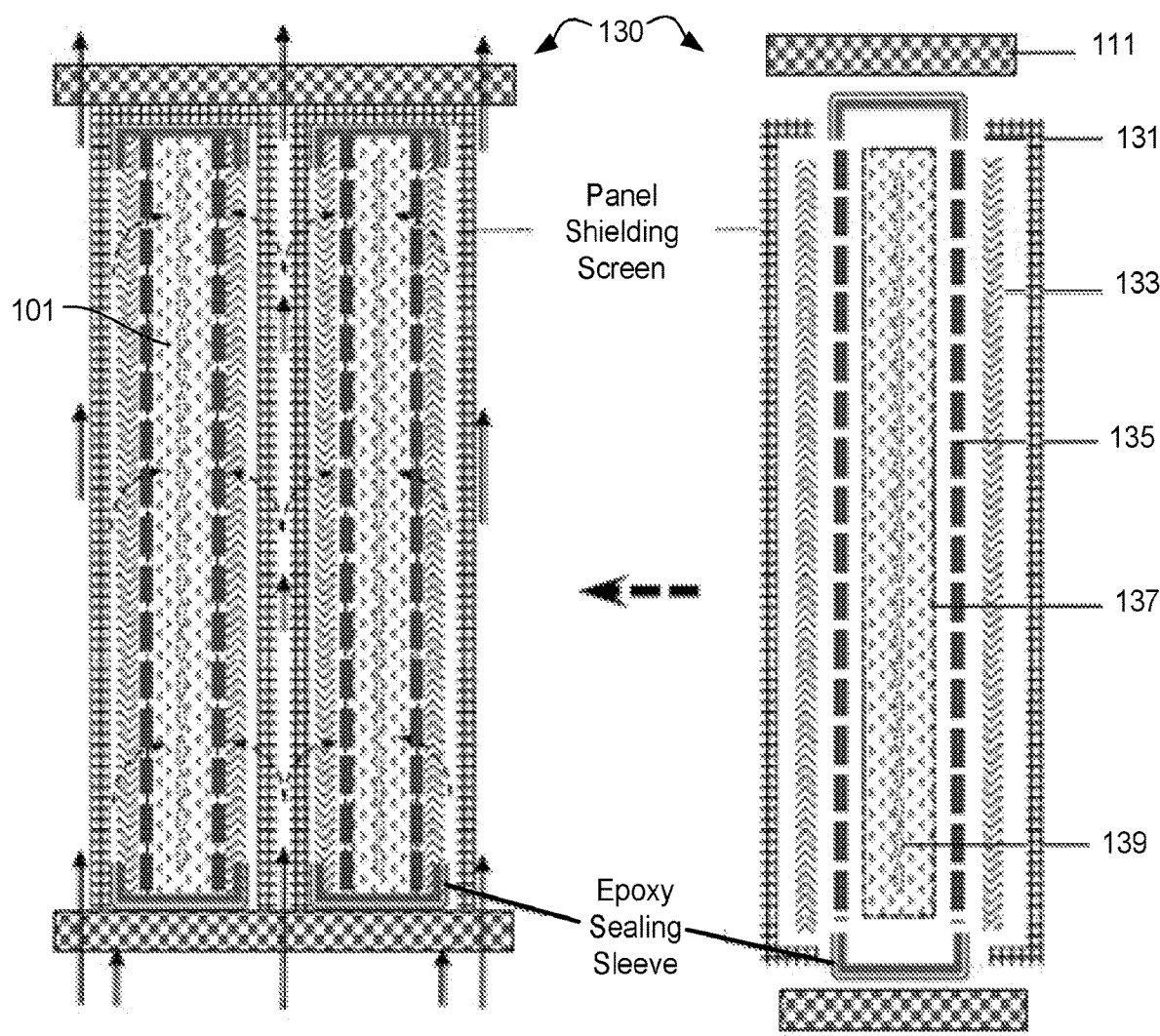
FIG. 5 is a side and end section views of a flat membrane panel system according to the preferred embodiment of the present application, using the panel assembly of FIG. 1.

FIG. 5 illustrates a top cross section of flat membrane panel parts and a corresponding assembled unit 130. Unit 130 incorporates the use of flat membranes 103 and panel assemblies 101 as seen in FIGS. 1 and 2. Furthermore, Unit 130 shows the membranes assembled in a high pressure ultra filtered saline water unit with two or more adjacent membrane panels. Unit 130 includes frame 111, an epoxy sealing sleeve 131 for the front and back edges of the reverse osmosis membrane panel, a feed spacer 133 made from a polyester or polypropylene membrane to provide additional and optional support; a seawater RO or brackish water RO polyamide or cellulose acetate flat sheet membrane 135; and a permeate carrier 137 (TRICOT). Carrier is a porous polysulfone membrane support board. It may have less than 5 micron pores (one or twin sheets), Zirfon with low zirconia. Also, interstitial porous aluminum oxide. A screen 139 is also present in unit 130. Screen 139 can be a woven metal screen having channels or nonwoven polyester or a polysulfone fiber mat.

Figure 6:
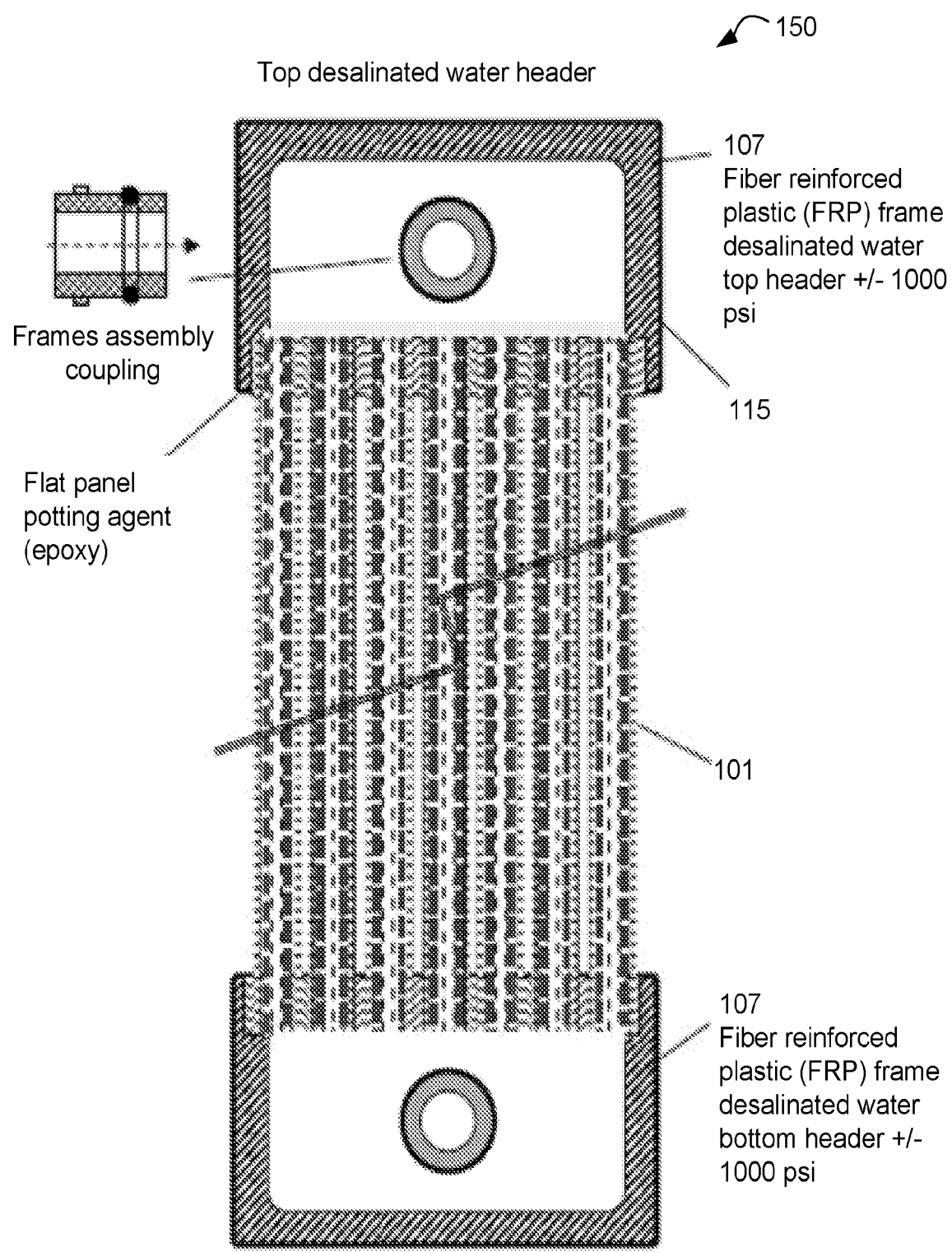
FIG. 6 is a cross section of an axial flow frame in the system of FIG. 5 and using the flat membrane panels of FIG. 1.
Figure 7:
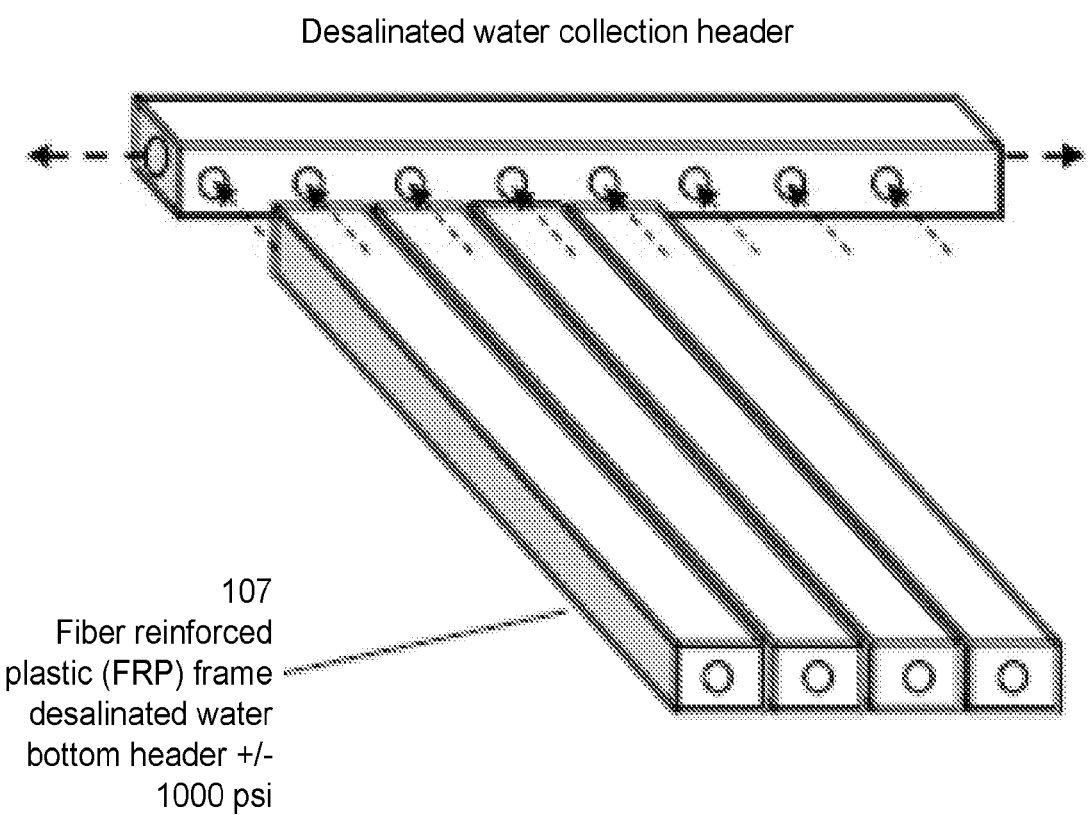
FIG. 7 is a desalinated water frame header for use in the flat membrane panel system of FIG. 5.

FIG. 6 illustrates a vertical cross-section in an Axial flow frame 150 comprising a stack of 6-12 flat membrane panels/assemblies 101. FIG. 7 shows the desalinated water frame headers and desalinated water collection header (top & bottom) as used in frame 150 of FIG. 6.

Figure 8:
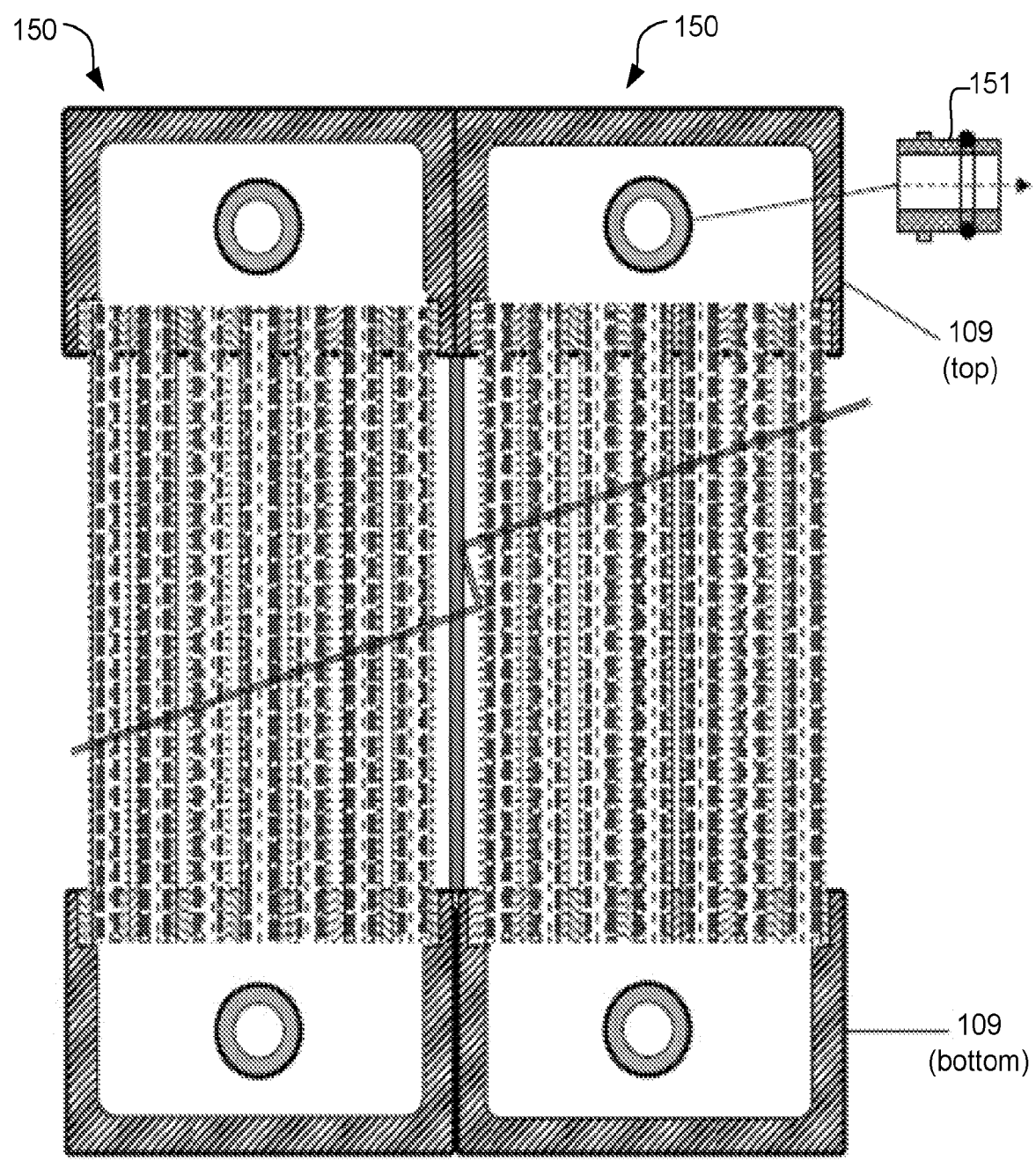
FIG. 8 is a vertical cross-section of two connected frames for use in the flat membrane panel system of FIG. 5.
Figure 9:
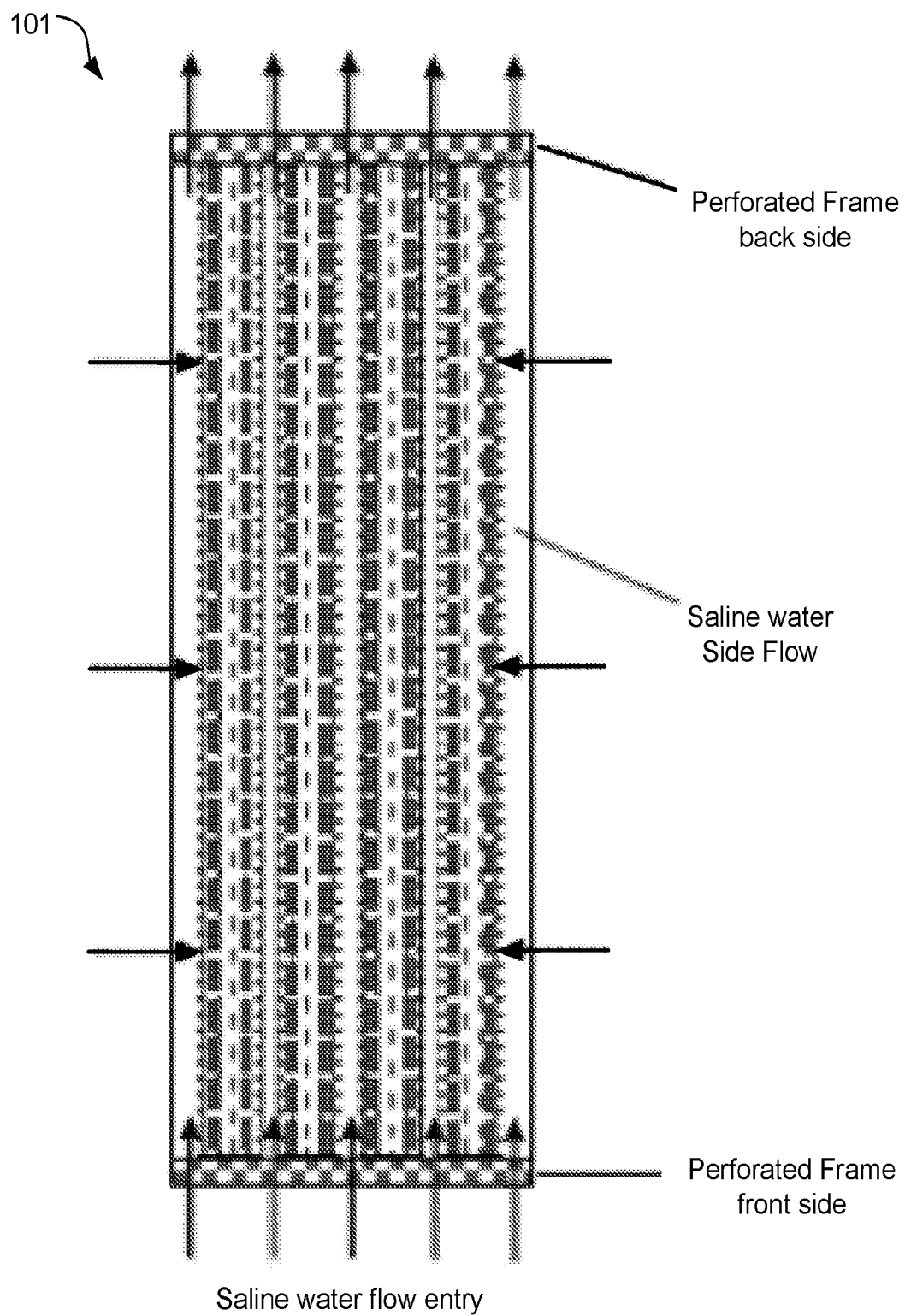
FIG. 9 is a top cross section of the flat membrane panels of FIG. 1.
Figure 10:
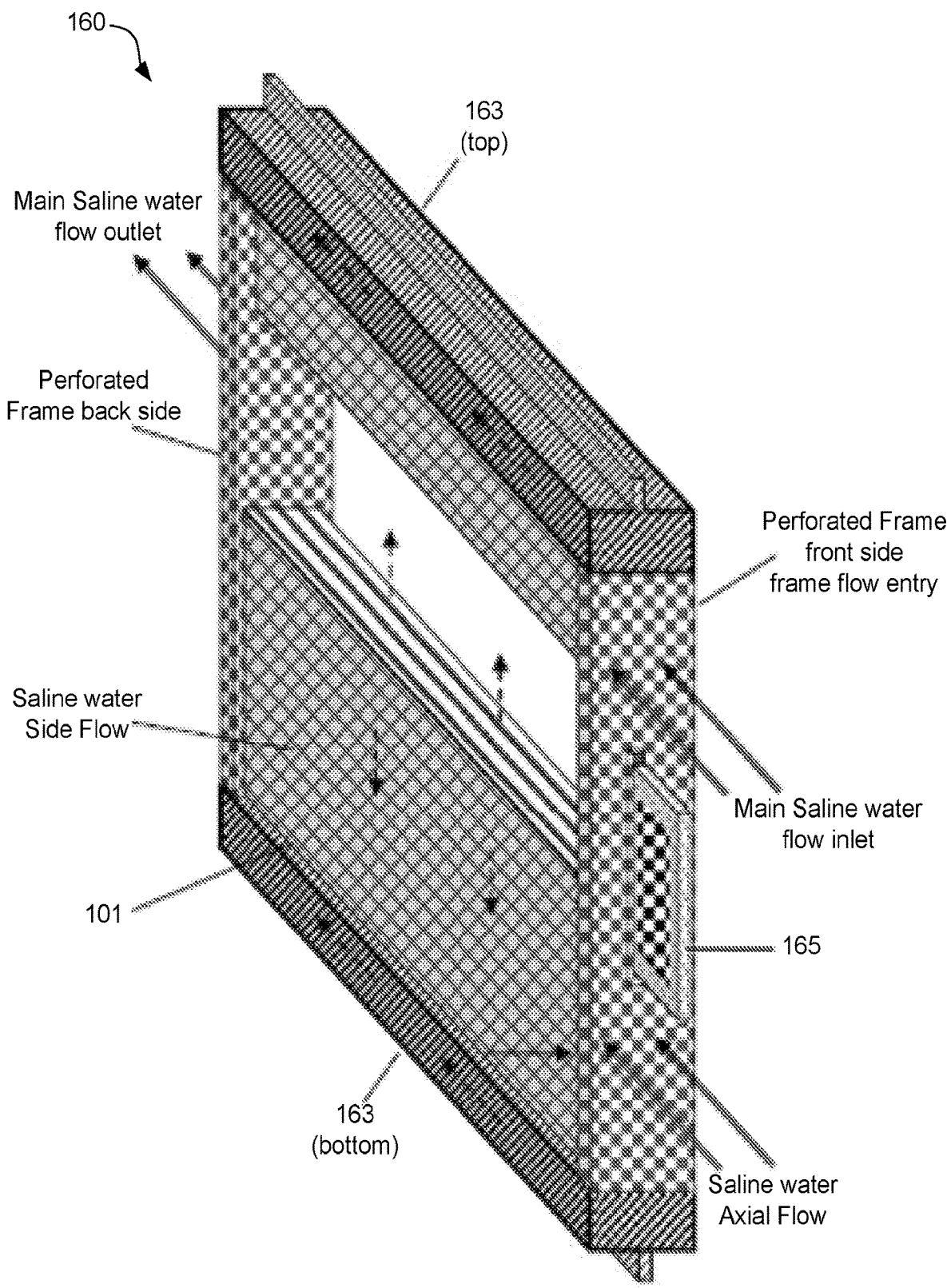
FIG. 10 is an alternative panel assembly of the panel assembly of FIGS. 1 and 2, holding multiple flat membrane panels.
Figure 11:
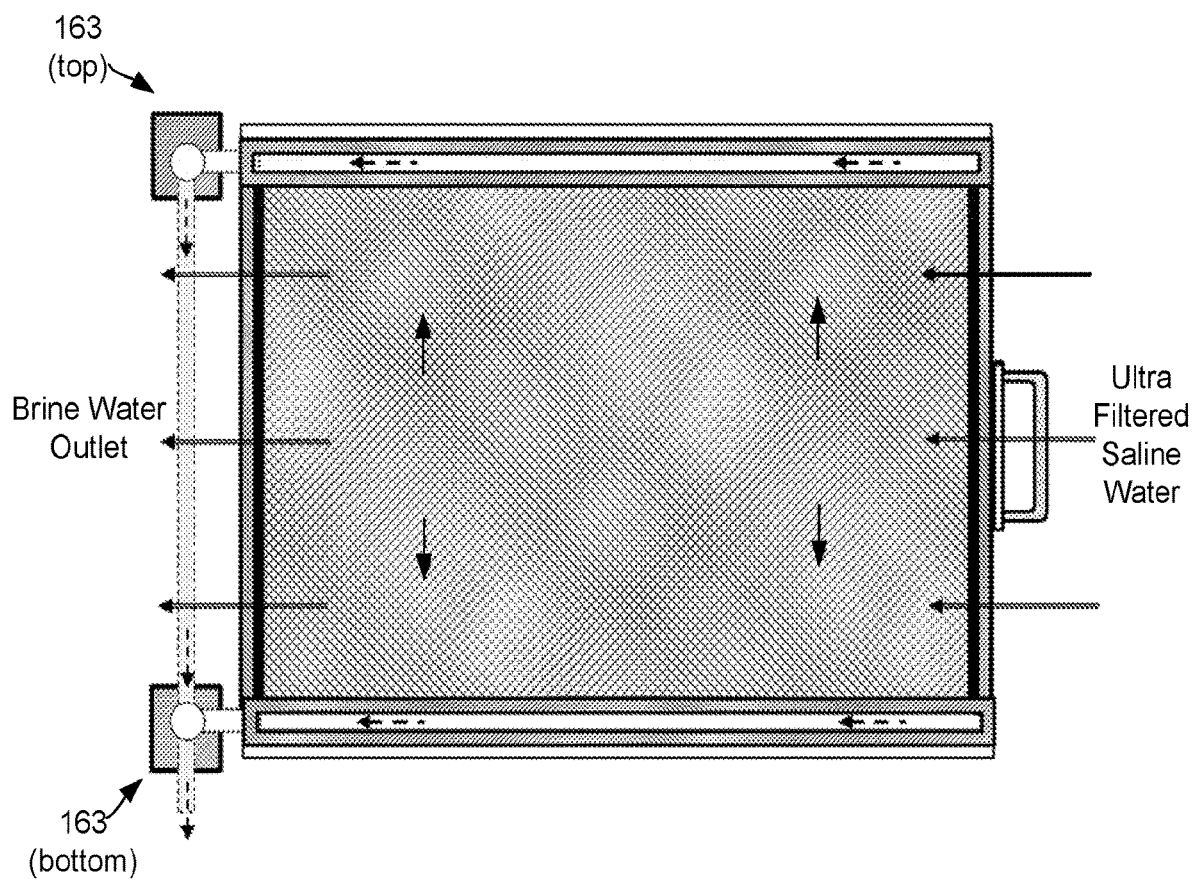
FIG. 11 is a side cross section view of the panel assembly used in the system of FIG. 5 with desalinated water collection headers.
Figure 12:
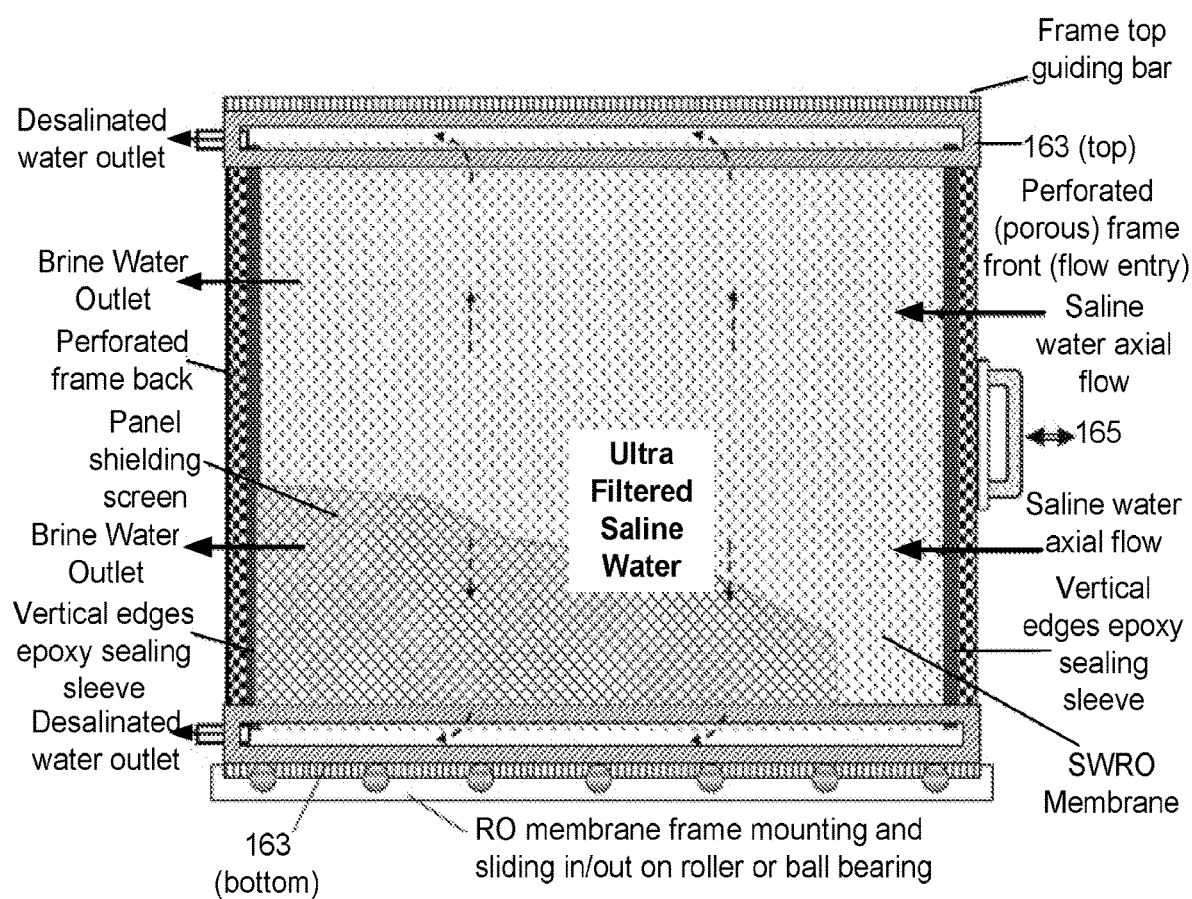
FIG. 12 is a side view of a flat membrane rectangular frame having one or more of the flat membrane panels of FIG. 1.

FIG. 8 shows a vertical cross-section of two connected frames 150 each comprising a stack of 6-12 flat RO membrane panels (leaves). FIG. 9 shows a stack of flat panels 101 at a top cross section;

FIG. 10 shows a flat frame 160 for multiple panels 101 similar to frame 107. Frame 160 includes a panel header 163 handling external pressure of 1000 psi or greater. Frame 160 has a main flow inlet and outlet through the sides of the frame. A handle 165 is also optionally included for handling frame 160. FIG. 11 shows the side cross section view of an axial flat membrane frame 160 and desalinated water collection headers 163. FIG. 12 shows a more detailed view of frame 160. FIG. 12 is a flat membrane rectangular frame similar in form and function to that of frame 160 using one or more membrane panels 101.

Figure 13:
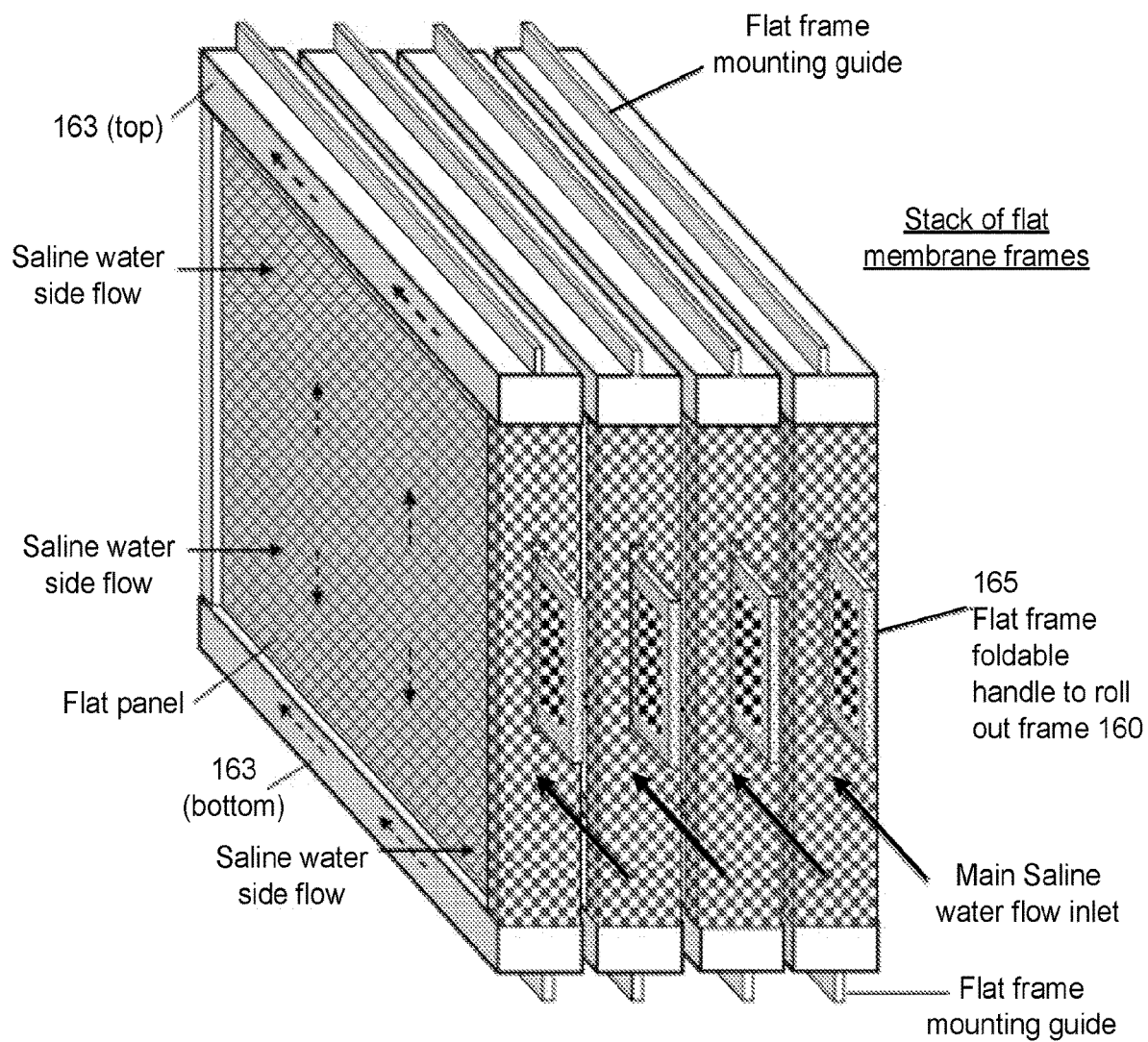
FIG. 13 is a perspective view of a plurality of flat membrane panels in the system of FIG. 5 in a stacked configuration.

In FIG. 13 a stack comprising 6-8 rectangular frames of flat membranes, mounted in cylindrical pressure vessel. Is shown. Each frame holds 12-18 panels (leaves). Frames varies from about 300 mm (~1 ft)-1000 mm (~4 ft) in width and up to about 1,800 mm (~6 ft) in length.

Figure 14:
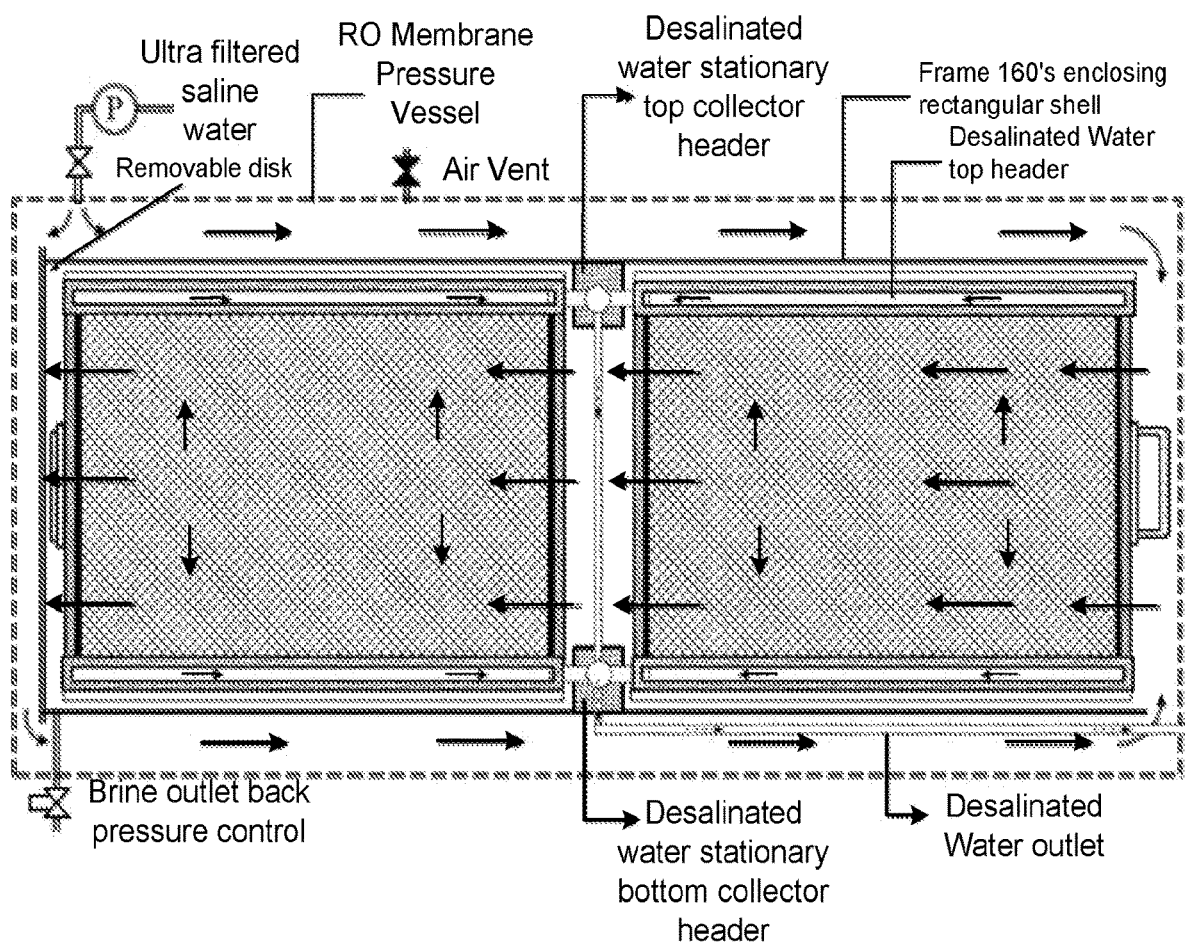
FIG. 14 is a side cross section view of separate stacks of the flat membrane panel assemblies of FIG. 1 stacked in a sequential desalination frame.

In FIG. 14, the stacks of desalination frames are sequentially stacked. Right frames are placed from the right side of the pressure vessel and left frames are from the left side. Pressure in the frames' enclosing rectangular shell is essentially the same as in the external pressure vessel.

Figure 15:
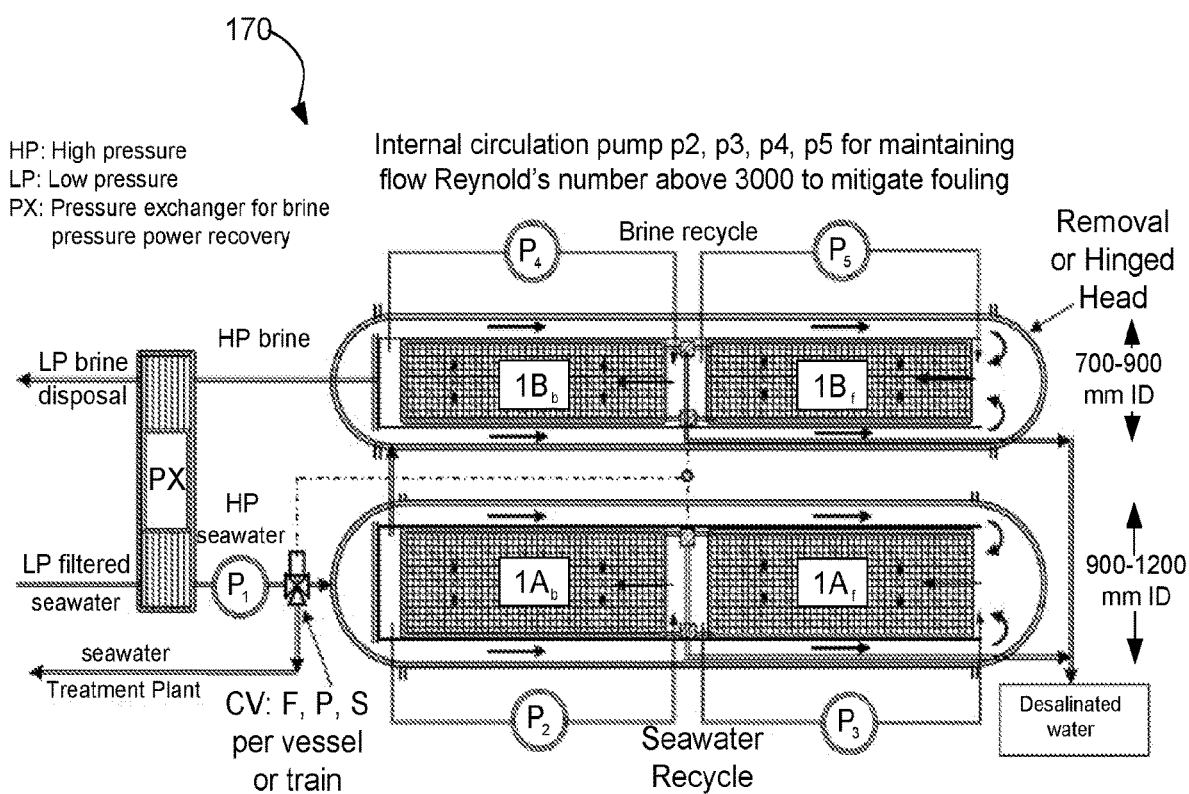
FIG. 15 is a view of agitated axial flat sheet membranes (FSM) of FIG. 1 in a variable flow reverse osmosis scheme.

In FIG. 15 an agitated axial flat sheet membranes (FSM) Variable flow reverse osmosis system 170 is shown. The system 170 includes pumps $P_2$, $P_3$, $P_4$, $P_5$, as internal circulation pumps. Each is configured to maintain the flow and recycle at flow at a particular Reynold's number above 3000 to mitigate fouling. Vessels 175 have a diameter sized to maintain relatively the same velocity in each vessel. An automated backflush of the membrane with desalinated water may occur via system 170. This will occur while releasing pressure on seawater supply and return it to pretreatment. The backflush may be activated by inadvertent reduction in desalinated water flow rate (F), changes in its salinity (S), or changes in seawater pressure (P).

Figure 16:
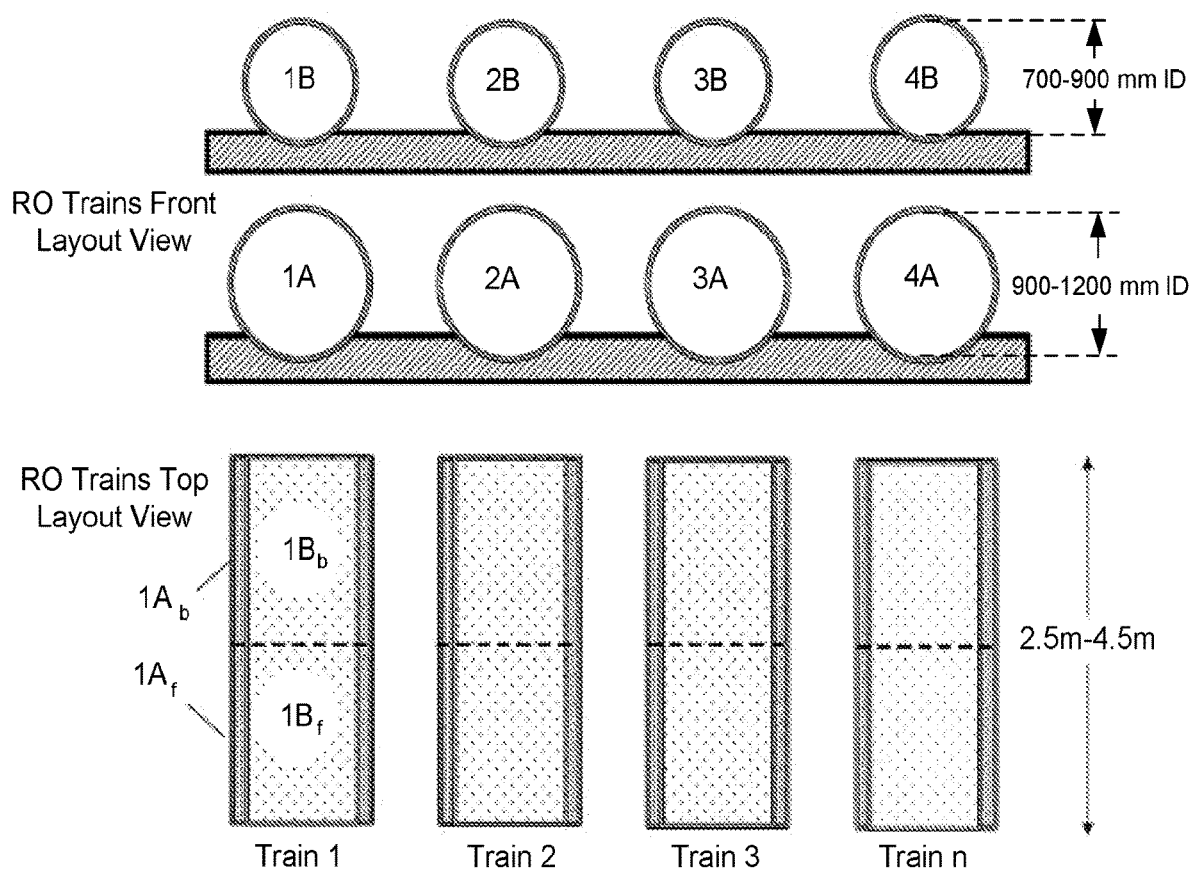
FIG. 16 is a view of the indoor or outdoor mounting of two tiers of reverse osmosis using the flat panel assemblies of FIG. 1.
Figure 17:
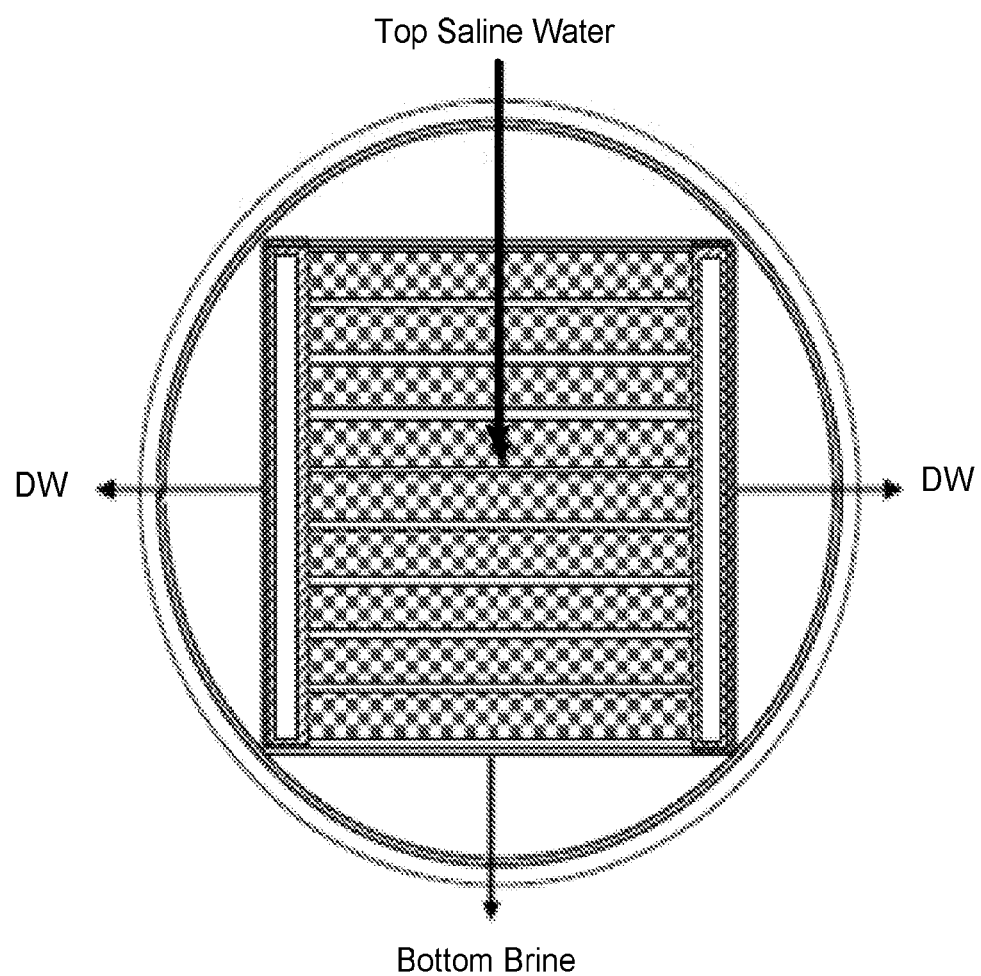
FIG. 17 is a cross section top view in vertical well reverse osmosis using the flat membranes of FIG. 1.
Figure 18:
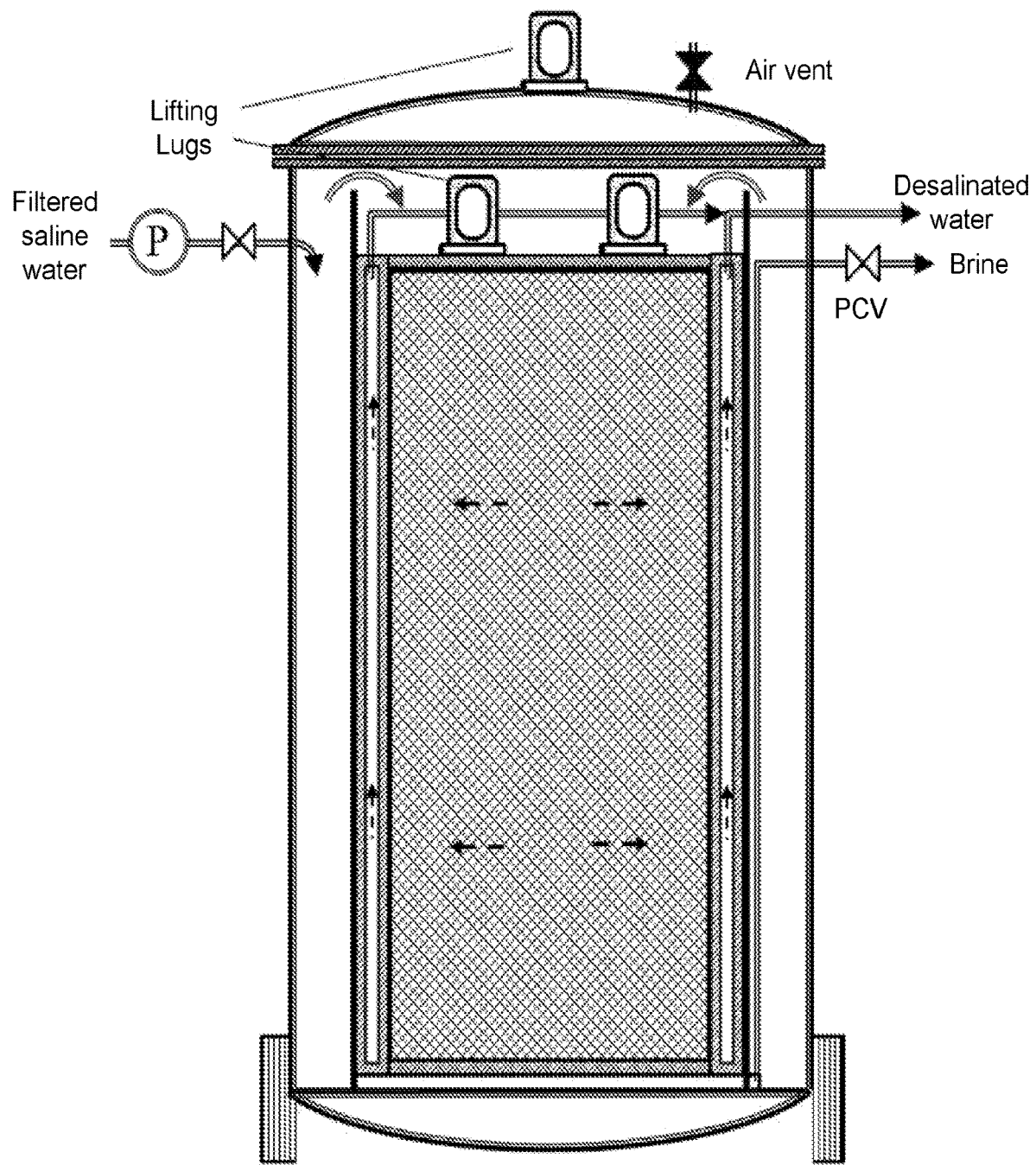
FIG. 18 is a side section view of an axial flow vertical well using the reverse osmosis flat membranes of FIG. 1.

In FIG. 16, two tiers of reverse osmosis vessels are shown, wherein each train comprises 2-6 sequential compartments. In FIG. 17, a cross section top view in vertical well reverse osmosis—flat membrane type 1 is illustrated. In FIG. 18, an axial flow vertical well reverse osmosis—flat membrane type 1, above or below grade, is illustrated.

The current application has many advantages over the prior art including at least the following: (1) process concept applicable in several processes including maximizing power generation, as in the case of Induced Symbiotic Osmosis [ISO] for salinity water power generation, seawater desalination recovery of 75% or higher, hypersaline water reverse osmosis, heatless solutes recovery by means of chemical potential dissimilarity of solutions, as well as fractionation of gases based on the kinematic diameters of molecules, employing series of semipermeable flat membrane cells operating in symbiotic fashion, where each process is formed of closed hydraulic loops operating within a concentration potential field; (2) a process and membrane that promotes the design of large scale renewable resources (LSRR) anywhere natural or manmade physical domains or ecological topography allows for cycling waters of dissimilar salt concentrations; and (3) a process and membrane that permits a system to generate power from world endorheic saline water, salt deposits, saline aquifers, dry salt lakes, formulated ionizable Inorganic salt solutions, as well as with a fully closed ISO systems relying essentially on daily solar heat cycle.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

The invention claimed is:

1. A flat sheet membrane panel system comprising:
   a plurality of membrane panel assemblies each comprising:

a membrane panel including at least two adjacent semipermeable flat sheet membranes in an un-rolled configuration of same size and specification, said flat sheet membranes being separated by a flat porous permeate carrier comprising an intermediate flow channel for communicating permeated desalinated water across said flat sheet membranes;

a sealing sleeve configured to secure and receive front and back edges of said membrane panel; and a protective rigid polymeric or rustproof metallic porous shielding screen configured to shield said membrane panel, and said sealing sleeve;

at least one end cap coupled to and configured to receive opposing ends of each or all of said membrane panel assemblies, said end cap each being configured to permit passage of fluid away from said membranes; and at least one frame configured to house each or all of said membrane panel assemblies, said frame including a top header, a bottom header, and porous side members configured to allow for passage of fluid or saline water, said top and bottom headers each being configured to receive one of said end cap, respectively, so said membranes are oriented in a vertical pattern between said top and bottom headers, said top and bottom headers being configured to communicate treated fluid or desalinated water from said membrane panel;

wherein said panel assemblies are separated apart to maintain flow Reynold's number of 3,000-3,500 for mitigating membrane fouling, maintaining a clearance of least of about 1-2 mm (0.04-0.08 inch) for regular maintenance practices.

2. The flat sheet membrane panel system of claim 1, wherein said frame is housed in holding compartments that are mounted within horizontal train of units, vertical pressure vessels and or multi stages towers.

3. The flat sheet membrane panel system of claim 1, wherein said frame is 10-15 cm (4-6 inch) in depth, comprising 6-12 of said panel assemblies.

4. The flat sheet membrane panel system of claim 1, wherein each of opposite membrane panel edges, left and right sides of said membrane panels, are heat or epoxy sealed.

5. The flat sheet membrane panel system of claim 1, wherein a stack of a plurality of said membrane panel are mounted within said end cap, and each of said end cap is inserted and epoxy sealed to a track defined in said top and bottom headers, respectively.

6. The flat sheet membrane panel system of claim 1, wherein said frame is up to one (1) meter in width and up to two (2) meters length.

7. The flat sheet membrane panel system of claim 1, wherein said flat sheet membranes, in an un-rolled configuration, are formed by at least one selected from the group consisting of:
as a tube by blowing the membrane polymeric material;
rolling and sealing a membrane flat sheet, then flatten it and pack it with permeate carrier material, as a preformed board;
laying down the permeate carrier material, as a preformed board, on a flat sheet membrane of size that exceeds the permeate carrier material perimeter, then roll said sheet around said board and seal its edges by adhesive sealing, heat sealing, or ultrasonic welding.

8. The flat sheet membrane panel system of claim 1, wherein said porous permeate carrier is a porous polysulfone membrane support board having a pore size of less than 5 micron, Zirfon® with low zirconia.

9. The flat sheet membrane panel system of claim 1, wherein each of said membrane panel assemblies further comprising at least one feed spacer made from a polyester or polypropylene membrane, said feed spacer being positioned between each of said membranes and said shielding screen.

10. The flat sheet membrane panel system of claim 9 further comprising:
an automated or semi-automated assembly platform for assembling said membrane panel, said assembly platform comprising a moving belt, where a first of said shielding screen is laid down on said belt, followed by a first of said feed spacer, then by said membrane panel, followed by a second of said feed spacer, then by a second of said shielding screen; and
wherein bottom and top edges of said shielding screens are continuously welded or epoxy sealed.

11. The flat sheet membrane panel system of claim 1 further comprising a screen positioned inside said porous permeate carrier, said screen is an interstitial porous aluminum oxide, a woven metal screen having channels, a non-woven polyester fiber mat or a polysulfone fiber mat.

12. The flat sheet membrane panel system of claim 1, wherein said flat sheet membranes are made of polyamide or cellulose acetate flat sheets.

13. The flat sheet membrane panel system of claim 1, wherein said top and bottom headers each include at least one outlet configured to allow passage of fluid or desalinated water, and wherein said porous side members are configured to allow pressurized saline water to pass therethrough and through said membranes.

14. The flat sheet membrane panel system of claim 1, wherein said plurality of membrane panel assemblies are configured for use with at least one system selected from the group consisting of water filtration, brackish water desalination, and seawater desalination, brines desalination, fluid extraction, solute recover, symbiotic salinity power generation, symbiotic hypersalinity reverse osmosis, and gas mixture fractionation.

15. The flat sheet membrane panel system of claim 1, wherein said flat sheet membranes have a rectangular shape.

16. The flat sheet membrane panel system of claim 1, wherein at least one of said top and bottom headers is configured to collect treated water.

17. The flat sheet membrane panel system of claim 1, wherein said frame further comprises a rolling device configured to translate said frame on said bottom header within a pressure vessel.

18. The flat sheet membrane panel system of claim 1, wherein said membrane panel assemblies each further comprises a porous protective woven fabric draping flat sides of said membrane panel.

19. A method of using a flat sheet membrane panel system for treating of a fluid using osmotic processes of various salinities and pressures, said method comprising the steps of:
a) introducing a pressurized untreated fluid to a first porous side member of a frame configured to house at least one membrane panel of a plurality of membrane panel assemblies, wherein each membrane panel including at least two adjacent semipermeable flat sheet membranes separated by a flat porous permeate carrier, and wherein at least one end cap being coupled to and configured to receive opposing ends of each or all of said membrane panel assemblies, said end cap each being configured to permit passage of fluid away from said membranes;

b) subjecting said membrane panel to said fluid, and passing said fluid parallel to said flat sheet membranes;
c) communicating permeated said fluid across said flat sheet membranes by way of an intermediate flow channel of said flat porous permeate carrier;
d) collecting a treated fluid by way of a track defined in a top and bottom header of said frame;
e) disposing of brine through a second porous side member of said frame; and
f) regulating pressure of said fluid in a pressure vessel, with said membrane panel located in said pressure vessel;
wherein said membrane panel further comprising a sealing sleeve configured to secure and receive front and back edges of said membrane panel, and a protective rigid polymeric or rustproof metallic porous shielding screen configured to shield said membrane panel, and said sealing sleeve;
wherein said frame including a top header, a bottom header, and porous side members configured to allow for passage of fluid or saline water, said top and bottom headers each being configured to receive one of said end cap, respectively, so said membranes are oriented in a vertical pattern between said top and bottom headers, said top and bottom headers being configured to communicate treated fluid or desalinated water from said membrane panel;
wherein said panel assemblies are separated apart to maintain flow Reynold's number of 3,000-3,500 for mitigating membrane fouling, maintaining a clearance of about 1-2 mm (0.04-0.08 inch) for regular maintenance practices.

20. The method of claim 19 further comprising the steps of:
agitating said fluid to regulate and maintain a preselected Reynold's number;
maintaining flat sheet membrane separation efficiencies by back flushing said fluid, said back flushing comprising the steps of:
releasing pressure of said fluid in a supply line by reducing its pumping pressure; and
reversing a direction of flow through said flat sheet membranes.

\* \* \* \* \*